US008278863B2

(12) United States Patent
Ford

(10) Patent No.: US 8,278,863 B2
(45) Date of Patent: Oct. 2, 2012

(54) TELESCOPING MAST

(75) Inventor: Thomas Davidson Ford, San Diego, CA (US)

(73) Assignee: NS Microwave, Spring Valley, CA (US)

( * ) Notice: Subject to any disclaimer, the term of this patent is extended or adjusted under 35 U.S.C. 154(b) by 418 days.

(21) Appl. No.: 12/456,445

(22) Filed: Jun. 16, 2009

(65) Prior Publication Data

US 2010/0313494 A1 Dec. 16, 2010

(51) Int. Cl.
*H02P 3/00* (2006.01)
*H02P 5/00* (2006.01)

(52) U.S. Cl. ........ 318/466; 318/266; 318/277; 318/468; 52/111; 52/146; 248/404

(58) Field of Classification Search .................. 218/266, 218/277, 437, 466, 468; 244/158 R; 248/405, 248/404; 52/111, 118, 146; 318/266, 466, 318/468, 277
See application file for complete search history.

(56) References Cited

U.S. PATENT DOCUMENTS

| | | | | |
|---|---|---|---|---|
| 3,648,316 | A | 3/1972 | Habian et al. | |
| 4,942,529 | A | 7/1990 | Avitan et al. | |
| 4,942,537 | A * | 7/1990 | Verry | 703/1 |
| 5,615,855 | A * | 4/1997 | Marue et al. | 248/405 |
| 6,145,583 | A * | 11/2000 | Gay et al. | 165/11.2 |
| 6,269,913 | B1 * | 8/2001 | Kollmannsberger et al. | 187/394 |
| 6,460,795 | B1 * | 10/2002 | Brown, Jr. | 242/378.2 |
| 7,023,162 | B2 * | 4/2006 | Robb et al. | 318/468 |
| 7,034,488 | B2 * | 4/2006 | Robb et al. | 318/468 |
| 7,187,150 | B2 * | 3/2007 | Robb et al. | 318/468 |
| 7,342,374 | B2 * | 3/2008 | Robb et al. | 318/468 |
| 7,497,140 | B2 * | 3/2009 | Blackwelder et al. | 74/89.28 |
| 7,966,777 | B2 * | 6/2011 | Douglas et al. | 52/118 |
| 7,969,109 | B2 * | 6/2011 | Masuo et al. | 318/437 |
| 2002/0000496 | A1 * | 1/2002 | Roth et al. | 244/158 R |
| 2003/0005796 | A1 * | 1/2003 | McCann | 81/99 |
| 2003/0090228 | A1 * | 5/2003 | Wilkens | 318/560 |
| 2004/0160205 | A1 * | 8/2004 | Robb et al. | 318/468 |
| 2005/0060935 | A1 * | 3/2005 | Robb et al. | 49/26 |
| 2005/0073275 | A1 * | 4/2005 | Robb et al. | 318/468 |
| 2005/0156092 | A1 * | 7/2005 | Shepherd et al. | 248/404 |
| 2005/0225276 | A1 * | 10/2005 | Robb et al. | 318/468 |
| 2005/0275364 | A1 * | 12/2005 | Robb et al. | 318/466 |
| 2006/0124819 | A1 * | 6/2006 | Wang | 248/404 |
| 2007/0028532 | A1 * | 2/2007 | Douglas et al. | 52/118 |
| 2009/0145056 | A1 * | 6/2009 | Pereira | 52/111 |
| 2011/0016804 | A1 * | 1/2011 | Howard et al. | 52/146 |
| 2011/0185647 | A1 * | 8/2011 | Diniz et al. | 52/111 |

OTHER PUBLICATIONS

PCT/US2010/038900 International Search Report and Written Opinion dated Sep. 7, 2010.

* cited by examiner

*Primary Examiner* — Paul Ip
(74) *Attorney, Agent, or Firm* — Duane Morris LLP; James Y. C. Sze

(57) ABSTRACT

A telescoping mast able to efficiently extend and retract multiple telescoping sections without jar and minimal energy. The telescoping mast has multiple telescoping sections, a position feedback sensor, a motor, a spring motor, and a computation unit. The position feedback sensor is coupled to at least one telescoping section and configured to identify a position of the telescoping sections. The motor is also coupled to the telescoping sections, and raises and lowers the telescoping sections. The computation unit controls the motor based on the position of the telescoping sections.

22 Claims, 4 Drawing Sheets

TELESCOPING MAST

BACKGROUND

1. Field of the Invention

Aspects of the present invention relate in general to a retractable telescoping mast. Aspects include a drive mechanism apparatus capable of efficiently extending and retracting the telescoping mast without jar. Further aspects of the invention include an apparatus or computer readable medium that processes position feedback to control the extension and retraction of the antenna mast.

2. Description of the Related Art

Telescoping masts of various types have been used in broadcasting and receiving radio messages in many different environments. Included in such developments are telescoping masts, which can be extended vertically or retracted vertically so that they can be mounted on a vehicle and transported to a desired site.

Telescoping masts are frequently used in mobile applications where a radio frequency antenna, temporary cell phone tower, camera, microwave television broadcast antenna or other payloads need to be placed in a position quickly and efficiently.

A mast can be retractable—wherein the mast can be retracted into a storage position in which the mast is relatively short in its overall height dimension. When fully extended or deployed, the overall height is many times larger than its retracted storage height dimension.

Most telescoping masts take a long time to deploy. For example, a four section steel mast might deploy from a 30 foot nested position to a 90 foot deployed position, in about 15 minutes. The energy requirement to move such a heavy and unwieldy mast is also enormous, resulting in the use of expensive motors in a mast drive mechanism.

Faster deploying units require greater power requirements to move the mast, and suffer from even greater problems. Usually the mast payload contains sensitive equipment, which can be damaged if the extension or retraction of the mast is sudden, or results in a jarring movement.

SUMMARY OF THE INVENTION

Embodiments of the invention include a telescoping mast apparatus, method and computer readable medium configured to raise or lower the mast apparatus. A telescoping mast is able to efficiently extend and retract multiple telescoping sections without jar. The telescoping mast has multiple telescoping sections, a position feedback sensor, a motor, and a computation unit. The position feedback sensor is coupled to at least one telescoping section and configured to identify a position of the telescoping sections. The motor is also coupled to the telescoping sections, and raises and lowers the telescoping sections. The computation unit controls the motor based on the position of the telescoping sections.

Some embodiments have either a spring motor or a capacitor energy storage unit to assist the motor, which may be electric.

DETAILED DESCRIPTION

One aspect of the present invention includes the realization that motors driving a telescoping mast may be supplemented by alternate power sources, and that controlling the motors with a computation unit may be used to eliminate jar in telescoping mast movement, resulting in a "soft landing" at any position.

Additionally, the speed of telescoping masts carrying camera payloads may have additional design considerations. For example, such masts deployed in hostile or combat areas may need to rapidly ascend and descend to avoid enemy fire.

Embodiments of the present invention include an apparatus, method, and computer-readable medium configured to control antenna movement to eliminate jar. Other embodiments of the present invention may include supplemental power sources to assist and reduce the power requirements of an electric motor.

Figure 1B:
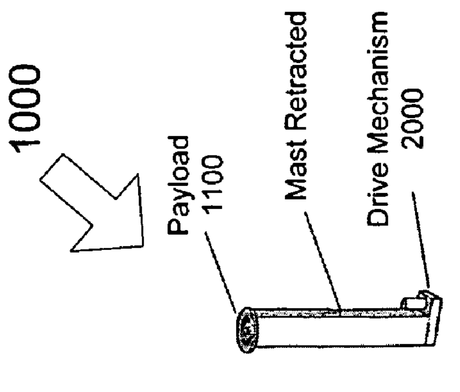
FIGS. 1A-B illustrates an embodiment of a telescoping mast deployed in an extended and retracted positions.
Figure 1A:
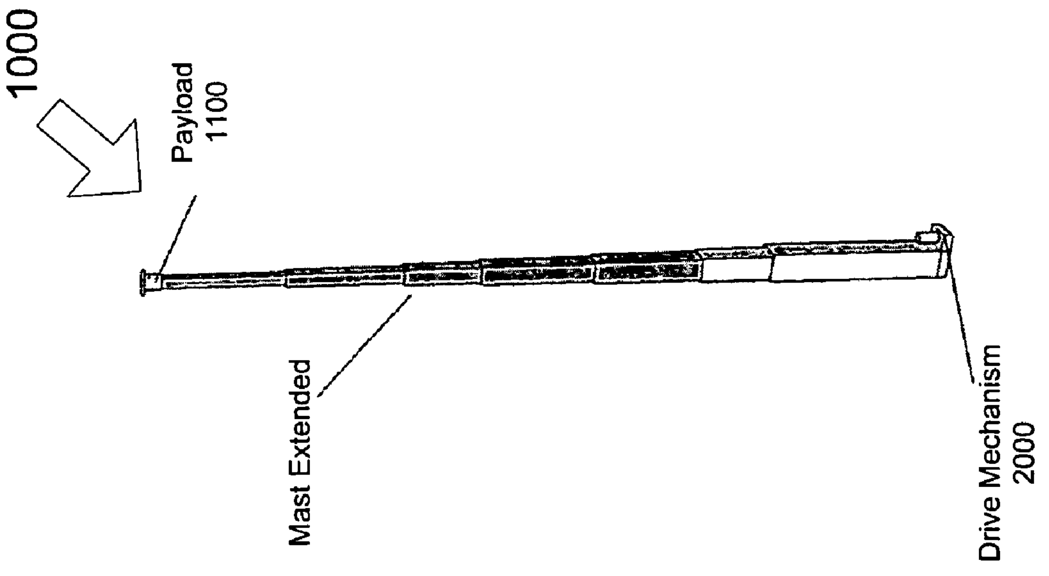

Operation of embodiments of the present invention may be illustrated by example. FIGS. 1A-B depict an example telescoping mast, constructed and operative in accordance with an embodiment of the present invention. Telescoping mast 1000, as shown in FIG. 1A, is a mast assembly extended with telescoping sections 1200A-G. For illustrative purposes only, seven telescoping sections 1200A-G are depicted supporting a payload 1100. It is understood by those known in the art that in embodiments of the present invention may be utilized with any number of telescoping sections 1200. An example mast assembly is U.S. Pat. No. 6,046,706, entitled "Antenna Mast and Method of Using Same." Payload 1100 may be any a radio frequency antenna, temporary cell phone tower antenna, camera, microwave television broadcast antenna or other payload known in the art.

Similarly, FIG. 1B depicts telescoping mast 1000 in a retracted state.

In both figures, a drive mechanism 2000 is used to power and control the extension and retraction of the mast 1000.

Figure 2:
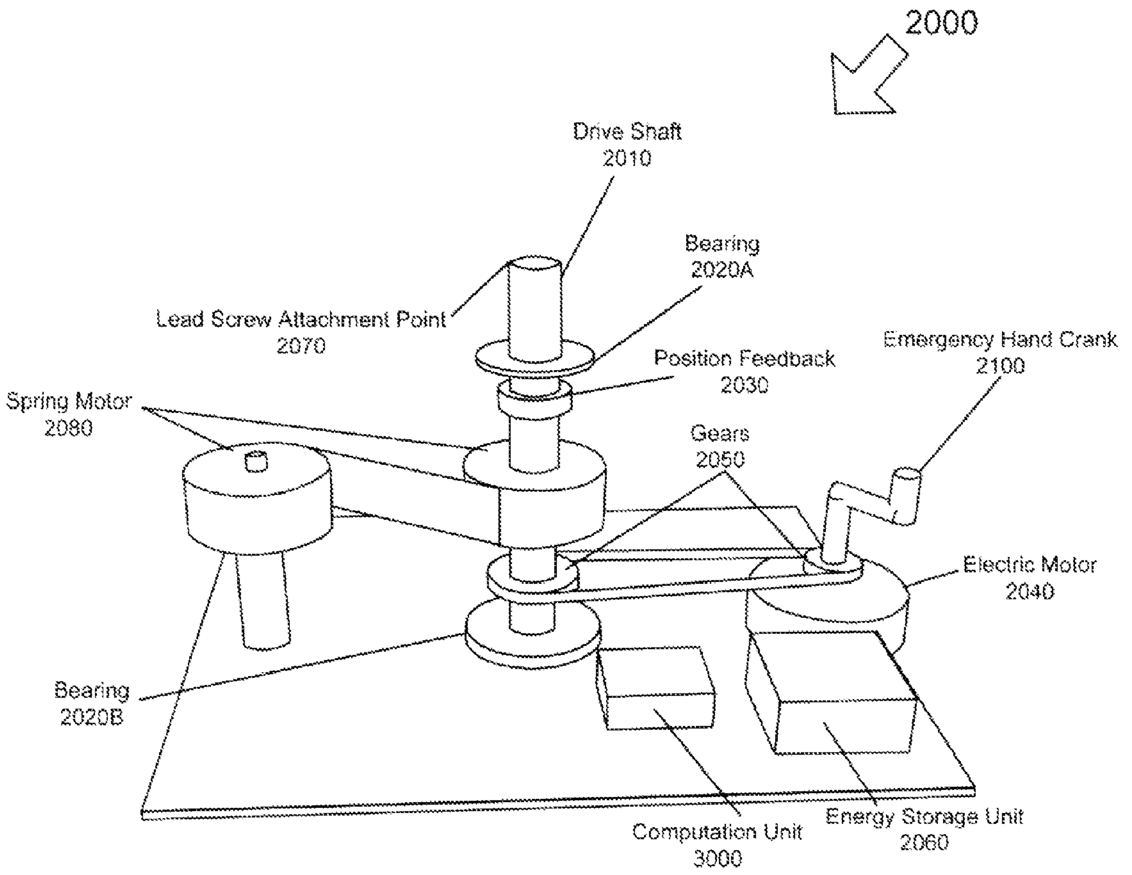
FIG. 2 is a diagram of a telescoping mast drive mechanism used to efficiently extend and retract the telescoping mast.

FIG. 2 illustrates an embodiment of a drive mechanism 2000 controlled by a computation unit 3000, constructed and operative in accordance with an embodiment of the present invention. Drive mechanism 2000 includes a drive shaft 2010 with multiple bearings 2020A-B, coupled to an electric motor 2040 through gears 2050AB. The drive mechanism 2000 further includes a position feedback sensor 2030, a motor 2040, and a computation unit 3000. In some instances, drive mechanism 2000 may include a crank 2100, to enable manual extension or retraction of the mast 1000.

The drive shaft 2010 itself may be connected to the internal portions of the telescoping sections 1200 via a lead screw attachment point 2070. It is understood that any attachment point 2070 known in the art capable of transferring the motion of drive shaft 2010 to telescoping sections 1200 would be sufficient.

Position feedback sensor 2030 may any sensor known in the art configured to communicate the telescoping mast 1000 position to computation unit 3000. The operation of computation unit 3000 is described below.

Motor 2040 may be any motor known in the art capable of raising or lowering telescoping mast 1000. For illustrative purposes only, motor 2040 is assumed to be an electric motor. The capacity of electric motor 2040 is determined by the mast size. Larger masts require greater horsepower motors. For example, electric motor 2040 could be a ⅛ horsepower DC permanent magnet motor.

Electric motor 2040 may be further supplemented with power from electrical energy storage unit 2060 and/or spring motor 2080.

Electrical energy storage unit 2060 may be any electrical energy storage unit known in the art, including, but not limited to an ultra capacitor or battery. Electrical energy storage unit 2060 provides a "power buffer" between the peak demands of mast (during mast raising and lowering) and the average load on the electric motor 2040. Moreover, electrical energy storage unit 2060 allows telescoping mast 1000 to extend or retract if motor 2040 is inoperable or damaged.

Spring motor 2080 may be any potential energy storage unit known in the art. Spring motor 2080 may assist or replace motor 2040 in extending or retracting mast 1000. Additionally spring motor 2080 is balanced and designed to match the weight and mass of the mast 1000 and its payload 1100.

In some embodiments, spring motor 2080 may be a constructed from a stressed constant force spring, such as B-Motor springs. B-Motor springs provide high amounts of torque in a small package. An example of such a spring motor 2080 is a constant torque motor from Spiroflex Division of the Kern-Liebers Ltd., part of the Kern-Liebers Group of Companies, of Schramberg, Germany. These spring motors 2080 provide rotational energy from the torque output drum, or linear motion with the use of a pulley, cable, or webbing. While it is convenient for the design that the spring motor 2080 to have constant torque, other spring motors known in the art, such as tortion bars, may be equally applicable.

Crank 2100 may be any manual crank known in the art to enable manual extension or retraction of telescoping mast 1000. Crank 2100 allows users to manually extend or retract telescoping mast 1000 when motor 2040 is inoperable. In some instances, energy from crank 2100 may also be stored by spring motor 2080.

Figure 3:
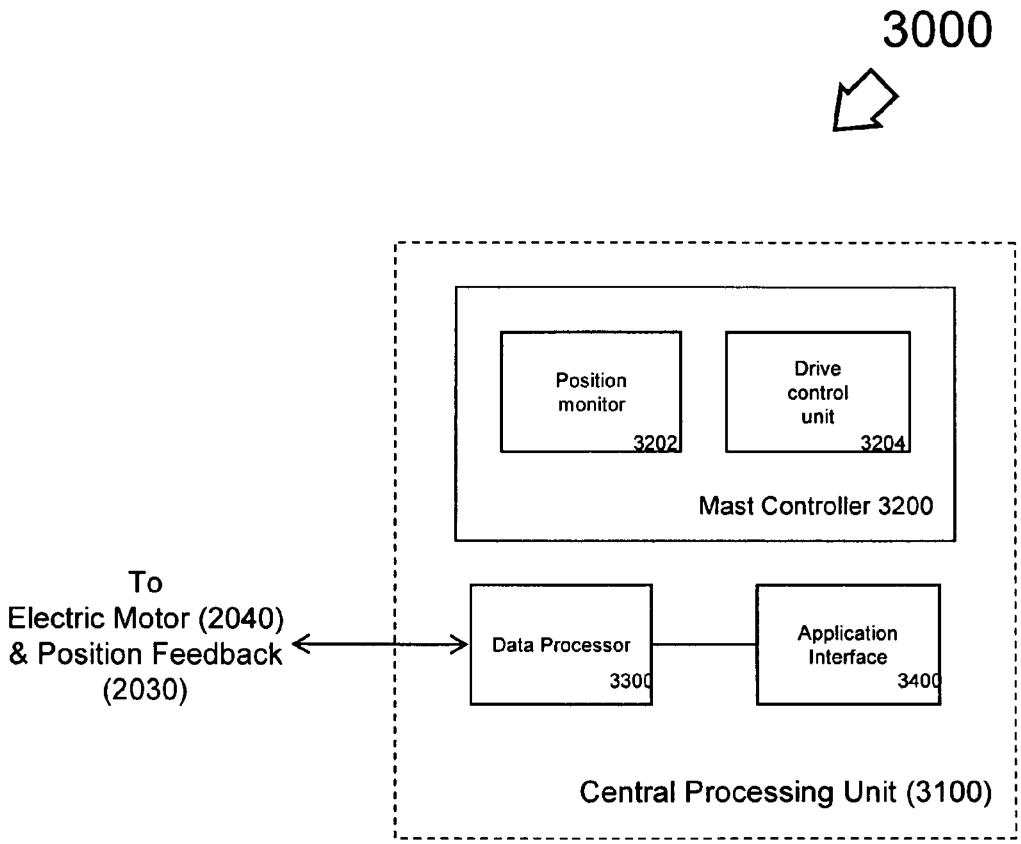
FIG. 3 is a block diagram of a telescoping mast computation unit used to control the drive mechanism.

FIG. 3 depicts a computation unit 3000, constructed and operative in accordance with an embodiment of the present invention. Computation unit 3000 comprises a central processing unit 3100 capable of communicating to electric motor 2040, and position feedback sensor 2030. Computation unit 3000 may run an embedded operating system (OS) and include at least one processor or central processing unit (CPU) 3100. In some alternate embodiments, computation unit 3000 runs a standard non-real-time operating system. Central processing unit 3100 may be any microprocessor or micro-controller as is known in the art.

The software for programming the central processing unit 3100 may be found at a computer-readable storage medium (not shown) or, alternatively, from another location across a communications network. Central processing unit 3100 is connected to computer memory. Computation unit 3000 may be controlled by an operating system that is executed within computer memory.

Storage medium may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data.

Turning to the functional elements contained within central processing unit 3100, central processing unit 3100 comprises mast controller 3200, data processor 3300, and application interface 3400. Mast controller 3200 further comprises position monitor 3202 and drive control unit 3204. It is well understood by those in the art, that these functional elements may be implemented in hardware, firmware, or as software instructions and data encoded on a computer-readable storage medium.

Data processor 3300 interfaces with storage medium, electric motor 2040, and position feedback sensor 2030. The data processor 3300 enables mast controller 3200 to locate data on, read data from, and send data to, these components.

Application interface 3400 enables central processing unit 3100 to take some action with respect to a separate software application or entity. For example, application interface 3400 may take the form of a windowing or other user interface, as is commonly known in the art.

The function of position monitor 3202 and drive control unit 3204 are described below.

Figure 4:
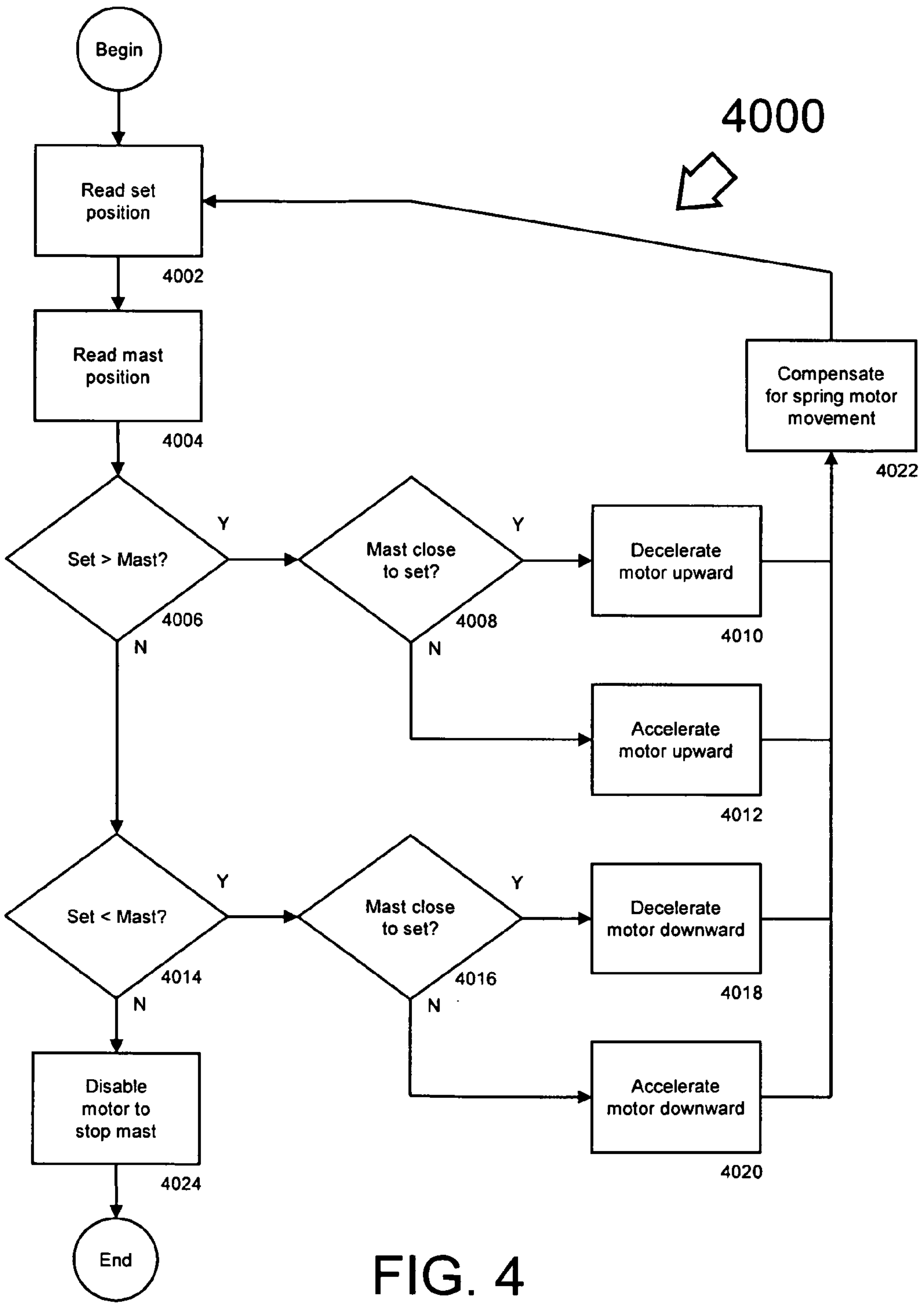
FIG. 4 is a flow chart of a method to control the extension and retraction of a telescoping mast without jar.

FIG. 4 is a flow chart of a process 4000 to control the extension and retraction of a telescoping mast without jar, coming in a smooth stop (also known as a "soft landing") in accordance with an embodiment of the present invention. Soft landings help prevent damage to sensitive payloads 1100, such as cameras, radio-frequency antennas, microwave television broadcast antennas, cellular phone towers, satellite communication dishes, and the like.

Initially, a user sets the desired position of the telescoping mast 1000. In some embodiments, telescoping mast 1000 may simply be set to extended or retracted positions. In other embodiments, variable telescoping mast 1000 heights may be specified, where the height is set in between the fully extended or fully retracted positions. In either case, the application interface 3400 reads the set position at block 4002.

Position monitor 3202 reads the actual (or "current") mast position, block 4004. In some embodiments, the extension and retraction of mast 1000 is measured by resistance or voltage fed into an analog-to-digital converter. In such embodiments, mast position may be indicated as a voltage on a variable resistor or potentiometer.

When the mast set position is greater than the actual position, as determined by mast controller 3200, flow continues at decision block 4008. Otherwise, flow continues at decision block 4014.

At decision block 4008, if the actual mast position is close to the set position, drive control unit 3204 decelerates electric motor upward, block 4010. If the actual mast position is not close to the set position, drive control unit 3204 accelerates electric motor upward, block 4012.

At block 4022, the mast controller 3200 compensates for movement by spring motor 2080.

When the mast set position is less than the actual position, as determined by mast controller 3200 at decision block 4014, flow continues at decision block 4016.

At decision block 4016, if the actual mast position is close to the set position, drive control unit 3204 decelerates electric motor downward, block 4018. If the actual mast position is not close to the set position, drive control unit 3204 accelerates electric motor downward, block 4020.

When the mast set position not less than the actual position, as determined by mast controller 3200 at decision block 4014, drive control unit 3204 disables the motor 2040, stopping mast movement at block 4024.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A telescoping mast comprising:

a plurality of telescoping sections;

a position feedback sensor coupled to at least one telescoping section, configured to identify a position of the telescoping sections;

a motor coupled to the telescoping sections, and configured to extend and retract the telescoping sections;

a computation unit configured to control the motor based on the position of the telescoping sections:

wherein the motor is coupled to the telescoping sections via a drive shaft; and a spring motor, coupled to the drive shaft, configured to rotate the drive shaft and store mechanical energy.

2. The telescoping mast of claim 1, wherein the motor is an electric motor.

3. The telescoping mast of claim 2, further comprising:

an electrical energy storage unit, coupled to the electric motor, configured to supplement electrical power to the electric motor.

4. The telescoping mast of claim 3, wherein the computation unit further comprises:

an application interface configured to read a set position input from a user of the telescoping mast.

5. The telescoping mast of claim 4, wherein the computation unit further comprises:

a position monitor configured to receive the position of the telescoping sections from the position feedback sensor.

6. The telescoping mast of claim 5, wherein the computation unit further comprises:

a drive control unit configured to decelerate the motor when the position of the telescoping sections is close to the set position, and accelerate the motor when the position of the telescoping sections is not close to the set position.

7. The telescoping mast of claim 6, further comprising:

a receiver configured to receive the user interface image from an external source.

8. The telescoping mast of claim 7, further comprising:

a payload.

9. The telescoping mast of claim 8, wherein the payload is a camera.

10. The telescoping mast of claim 8, wherein the payload is a radio-frequency antenna.

11. A method of raising or lowering a telescoping mast, comprising:

receiving a set position input from a user of the telescoping mast via an application interface;

reading an actual position of the telescoping mast via a position feedback sensor;

decelerating a motor when the actual position of the telescoping mast is close to the set position, the motor being coupled to the telescoping sections via a drive shaft, and with a spring motor, coupled to the drive shaft, configured to rotate the drive shaft and store mechanical energy;

accelerating the motor when the actual position of the telescoping mast is not close to the set position; and stopping the motor when the actual position of the telescoping mast is the set position.

12. The method of claim 11, wherein the motor is an electric motor.

13. The method of claim 12, the telescoping mast further comprising:

an electrical energy storage unit, coupled to the electric motor, configured to supplement electrical power to the electric motor.

14. The method of claim 13, the telescoping mast further comprising:

a payload.

15. The method of claim 14, wherein the payload is a camera.

16. The method of claim 15, wherein the payload is a radio-frequency antenna.

17. A computer-readable medium configured to raise or lower a telescoping mast, encoded with data and instructions, such that when executed by a device, the instructions causes the device to:

receive a set position input from a user of the telescoping mast via an application interface;

read an actual position of the telescoping mast via a position feedback sensor;

decelerate a motor when the actual position of the telescoping mast is close to the set position, the motor being coupled to the telescoping sections via a drive shaft, and with a spring motor, coupled to the drive shaft, configured to rotate the drive shaft and store mechanical energy;

accelerate the motor when the actual position of the telescoping mast is not close to the set position; and stop the motor when the actual position of the telescoping mast is the set position.

18. The computer-readable medium of claim 17, wherein the motor is an electric motor.

19. The computer-readable medium of claim 18, the telescoping mast further comprising:

an electrical energy storage unit, coupled to the electric motor, configured to supplement electrical power to the electric motor.

20. The computer-readable medium, of claim 19, the telescoping mast further comprising:

a payload.

21. The computer-readable medium of claim 20, wherein the payload is a camera.

22. The computer-readable medium of claim 21, wherein the payload is a radio-frequency antenna.

* * * * *